United States Patent
Smith

(10) Patent No.: US 10,740,464 B2
(45) Date of Patent: Aug. 11, 2020

(54) SELF-SCANNING OF DEPLOYED SOFTWARE APPLICATIONS

(71) Applicant: Veracode, Inc., Burlington, MA (US)

(72) Inventor: Bradford M. Smith, Fountain Valley, CA (US)

(73) Assignee: Veracode, Inc., Burlington, MA (US)

( * ) Notice: Subject to any disclaimer, the term of this patent is extended or adjusted under 35 U.S.C. 154(b) by 205 days.

(21) Appl. No.: 15/612,593

(22) Filed: Jun. 2, 2017

(65) Prior Publication Data
US 2018/0349611 A1   Dec. 6, 2018

(51) Int. Cl.
| | | |
|---|---|---|
| G06F 21/56 | (2013.01) | |
| G06F 21/57 | (2013.01) | |
| G06F 8/60 | (2018.01) | |
| H04L 29/06 | (2006.01) | |

(52) U.S. Cl.
CPC .......... G06F 21/562 (2013.01); G06F 21/577 (2013.01); H04L 29/06904 (2013.01); H04L 29/06911 (2013.01); H04L 63/1433 (2013.01); G06F 8/60 (2013.01)

(58) Field of Classification Search
CPC ............. H04L 63/1433; H04L 63/1416; H04L 63/1425; H04L 63/1441; H04L 63/1491; H04L 29/06904; H04L 29/06911; G06F 21/562; G06F 8/60; G06F 21/577
See application file for complete search history.

(56) References Cited

U.S. PATENT DOCUMENTS

| | | | | |
|---|---|---|---|---|
| 2003/0028803 A1* | 2/2003 | Bunker, V | ............. | H04L 43/00 726/4 |
| 2009/0164760 A1* | 6/2009 | Sterbenz | ............. | G06F 9/44521 712/216 |
| 2012/0072968 A1* | 3/2012 | Wysopal | ............. | G06F 11/3612 726/1 |
| 2014/0165204 A1* | 6/2014 | Williams | ............. | G06F 21/577 726/25 |
| 2014/0297589 A1* | 10/2014 | Chen | ................... | H04L 67/1095 707/624 |
| 2014/0359771 A1* | 12/2014 | Dash | ................... | H04L 63/1408 726/23 |
| 2017/0034023 A1* | 2/2017 | Nickolov | ............ | H04L 43/0817 |

\* cited by examiner

*Primary Examiner* — Alexander Lagor
*Assistant Examiner* — Howard H. Louie
(74) *Attorney, Agent, or Firm* — Gilliam IP PLLC

(57) ABSTRACT

In a system for facilitating detection of vulnerabilities in a deployed software application, a software component (also called a self-scanning component) is provided for integration with the software application. The self-scanning component is configured to detect one or more conditions associated with the deployment of the software application and, upon the detection of such condition(s), to collect and/or transmit at least a portion of the application code to a vulnerability scanner. The self-scanning component can receive a vulnerability report from the scanner and can present the report or an analysis of the report. The presentation can be a display or inclusion of the report or analysis thereof in a log generated by the software application.

37 Claims, 2 Drawing Sheets

SELF-SCANNING OF DEPLOYED SOFTWARE APPLICATIONS

FIELD OF THE INVENTION

This disclosure generally relates to vulnerability assessment of software systems and, more particularly, to systems and methods for performing customizable vulnerability scanning of software applications after deployment thereof.

BACKGROUND OF THE INVENTION

A typical software development process starts with defining the functionality a software app is expected to provide. In some cases, a new app is developed to provide the desired functionality and in other cases an existing app is revised/updated to provide the defined functionality. Certain performance parameters such as expected execution time, memory footprint, whether the app can be executed in parallel on two or more nodes, etc., may also be specified. Thereafter, one or more programmers/developers develop the code for the software app. Such code development can include writing new code; repurposing or modifying existing code; and obtaining and using third-party code such as open source code, code developed by one or more contractors, and using third-party libraries and/or executables. Code, in general, can include source code that can be compiled or interpreted, and scripts.

Typically, when the development of a particular code module or a set of code modules is completed, the module(s) are tested to determine whether the module(s) provide the functionality intended to be provided by those module(s). Such testing may also include testing whether the module(s) meet one or more performance goals for the module(s). In addition, the module(s) may be tested for compliance, such as compliance with the organization's coding practices, requirements imposed by other module(s) and/or software application(s) with which the module(s) under test and/or the app under development are expected to interact, etc. The module(s) may also be tested for security vulnerabilities, e.g., to detect whether the implementation would permit unauthorized access to the module code, other parts of the software app, data processed by the software app, etc. One or more modules may be modified based on the results of the testing and, after the modification, may be retested, as discussed above.

Generally, when the development of all or several modules is completed, or at least reaches a stage at which at least a subset of modules of the software app can be integrated together, such integration is performed to obtain an at least partially functional software app. The integrated software app may then be tested as described above, e.g., to ensure functionality, performance, compliance, and/or lack of unacceptable security vulnerabilities. One or more modules may be modified based on the result of the testing. During the process of developing a software app, the development and testing of individual modules (also called components), the integration of various software modules, and testing of the partially or fully integrated software app may be performed one or more times until the software app is determined to be ready for release/deployment. The steps of integration and testing partially or fully integrated app are typically performed not by the development engineers but by one or more production engineers (also called release engineers or quality assurance (QA) engineers).

The integrated and tested software app can be released/deployed in several ways, e.g., by shipping CDs/DVDs containing the app to customers, making the app available for downloading via the app owner's website, posting the app to a third-party store, and by hosting the app using the app owner's computing systems/servers and/or using a third party's hosting services, where the solution(s) that can be obtained using the app are made available as services to the clients. In some cases, the clients may host the app in providing services to end users. Alternatively or in addition, a client may redistribute the app, using any of the techniques discussed above, to one or more end users. The redistributed app may be integrated or combined with other software component(s) provided by the client.

Upon receiving a copy of the deployed app, an app user (which can be a client and/or an end user), may scan the app to ensure that it does not contain a computer virus, adware, malware, etc. App users typically do not perform any additional testing (e.g., functionality, performance, and/or vulnerability testing), however. One reason why the additional testing is not performed is that the app users typically do not have access to the test-case suites and/or testing/vulnerability scanning programs required for such testing. Second, the app users generally do not have access to the app source code and may be contractually obligated from modifying it. Therefore, they cannot take advantage of such testing, e.g., by modifying the code to address any issues identified during the testing.

SUMMARY OF THE INVENTION

Various embodiments described herein feature techniques that facilitate vulnerability scanning of a software app after deployment thereof. This is achieved, at least in part, by integrating a component (sometimes referred to as vulnerability scanning component or a self-scanning component) with the software app, where the component is configured to detect one or more conditions associated with the deployment of the software app. Such conditions may include the initial deployment and/or upgrade to a new version and/or change/upgrade in the version of a component of the deployed app. The conditions may also include elapsing of a selected time after the initial deployment and/or after the last vulnerability scanning of the deployed app. When one or more conditions are determined to be true, the self-scanning component collects one or more of source-code file(s), script(s), executable(s), and/or partially compiled and/or interpretable object code file(s) associated with the app, and transmits them for vulnerability scanning thereof. The results of the vulnerability scanning may be reported to the app owner/app developers and/or to the app user. The vulnerability scanning results may be integrated with a log file generated during routine execution of the software app.

Accordingly, in one aspect, a method is provided for facilitating vulnerability analysis of a software application. The method includes the steps of: detecting by a software component (also referred to as a self-scanning component) integrated with a software application, occurrence of a condition corresponding to deployment of the software application and, in response to the occurrence of the condition, transmitting by the software component to a vulnerability scanner, a set of code files associated with the software application. The method also includes receiving and presenting by the software component a vulnerability analysis report for the software application. The software application can be a web application, a web service, or a client application. The deployment of the software application may include one or more of: (i) installation of a code file associated with the software application, in a runtime environment on a client device; (ii) execution of the code file in the runtime on the client device; and (iii) uploading the code file, for distribution thereof, to a distribution environment on another device. Generally, the runtime and distribution environments are outside of a software development environment.

In some embodiments, detecting the occurrence of a condition corresponding to deployment of the software application includes determining that a particular version of the software application has been deployed initially. Detecting the occurrence of a condition corresponding to deployment of the software application may also include determining that a user-configurable or specified time period has elapsed since a particular version of the software application was: (i) deployed initially, or (ii) last analyzed for vulnerabilities therein. In some embodiments, detecting the occurrence of a condition corresponding to deployment of the software application includes determining that a particular version of the software application as deployed has been modified, e.g., by applying a patch to an installed version, by replacing one of the components with a different component or version thereof, etc. The set of code files, which is transmitted to a scanner, may include one or more files associated with the modification.

In some embodiments, detecting the occurrence of a condition corresponding to deployment of the software application includes receiving by the software component a notification indicating an upgrade to the vulnerability scanner and/or identification of a new vulnerability. If a scanner is upgraded/improved and/or if a new vulnerability or a new kind of vulnerability becomes known, the scanner itself can notify various self-scanning components integrated with different deployed software apps and, in response, those self-scanning components can upload the respective software apps for scanning. Alternatively or in addition, the method may include polling the vulnerability scanner by the software component, so that the notification may be received in response to the polling.

In some embodiments, presenting by the software component (i.e., the self-scanning component) the vulnerability analysis report includes generating a first log event or notification indicating whether a vulnerability scan was completed successfully. Additionally or in the alternative, presenting the vulnerability analysis report may include generating a second log event or notification indicating whether the software application: (a) has a vulnerability, (b) has no detected vulnerabilities, (c) is not compliant with a specified vulnerability profile, and (d) is compliant with the specified vulnerability profile. In some embodiments, presenting the vulnerability analysis report includes writing the first and/or second log events into an application log file. In some embodiments, presenting the vulnerability analysis report includes displaying the first and/or second notifications during execution of the application.

In another aspect, a computer system for facilitating vulnerability analysis of a deployed software application includes a processing unit and a memory coupled to the processing unit. The memory includes instructions which, when executed by the processing unit, program the processing unit to operate as a software component (also referred to as a self-scanning component) integrated with a software application, where the software component is configured to: detect occurrence of a condition corresponding to deployment of the software application and, in response to the occurrence of the condition, transmit to a vulnerability scanner, a set of code files associated with the software application. The execution of the instructions by the processing unit also configures the software component to receive and present a vulnerability analysis report for the software application. In various embodiments, the instructions can program the processing unit to operate as the software component configured to perform one or more of the method steps described above.

In another aspect, an article of manufacture that includes a non-transitory storage medium has stored therein instructions which, when executed by a processing unit program the processing unit, which is in electronic communication with a memory, to operate as a software component (also referred to as a self-scanning component) integrated with a software application and configured to: detect occurrence of a condition corresponding to deployment of the software application and, in response to the occurrence of the condition, transmit to a vulnerability scanner, a set of code files associated with the software application. The execution of the instructions by the processing unit also configures the software component to receive and present a vulnerability analysis report for the software application. In various embodiments, the stored instructions can program the processor to perform one or more of the method steps described above.

In another aspect, a method is provided for facilitating vulnerability analysis of a software application. The method includes configuring a software component that is integratable with a software application during compilation or execution thereof, and providing the software component (also referred to as a self-scanning component) to a software development environment of the software application. The software component is configured to: (i) determine occurrence of a condition corresponding to deployment of the software application; and (ii) transmit a set of code files associated with the software application to a vulnerability scanner. The software application can be a web application, a web service, or a client application. The deployment of the software application may include one or more of: (i) installation of a code file associated with the software application, in a runtime environment on a client device; (ii) execution of the code file in the runtime on the client device; and (iii) uploading the code file, for distribution thereof, to a distribution environment on another device. Generally, the runtime and distribution environments are outside of a software development environment.

In some embodiments, to detect the occurrence of a condition corresponding to deployment of the software application, the software component is configured to determine that a particular version of the software application has been deployed initially. To detect the occurrence of a condition corresponding to deployment of the software application, the software component may be configured to determine that a specified time period has elapsed since a particular version of the software application was: (i) deployed initially, or (ii) last analyzed for vulnerabilities therein. The specified time period may be user configurable. To detect the occurrence of a condition corresponding to deployment of the software application, the software component may be configured to determine that a particular version of the software application as deployed has been modified, e.g., by applying a patch to an installed version, by replacing one of the components with a different component or version thereof, etc. The set of code files that is to be transmitted to a scanner, may include a file associated with the modification.

In some embodiments, to detect the occurrence of a condition corresponding to deployment of the software application, the software component is configured to receive a notification indicating an upgrade to the vulnerability scanner and/or the identification of a new vulnerability. The software component may be configured to poll the vulnerability scanner, wherein the notification is received in response to the polling.

In some embodiments, to present the vulnerability analysis report, the software component is configured to generate a first log event or notification indicating whether a vulnerability scan was completed successfully. Additionally or in the alternative, the software component may be configured to generate a second log event or notification indicating whether the software application: (a) has a vulnerability, (b) has no detected vulnerabilities, (c) is not compliant with a specified vulnerability profile, or (d) is compliant with the specified vulnerability profile. The software component may also be configured to write the first and/or second log events into an application log file. Alternatively or in addition, to present the vulnerability analysis report, the software component may be configured to display (e.g., in an app window or a pop-up window) the first and second notifications during execution of the application.

In another aspect, a computer system provided for facilitating vulnerability analysis of a deployed software application includes a first processor and a first memory coupled to the first processor. The first memory includes instructions which, when executed by a processing unit that includes the first processor and/or a second processor, program the processing unit, that is in electronic communication with a memory module that includes the first memory and/or a second memory, to: configure a software component that is integratable with a software application during compilation or execution thereof, and to provide the software component (also referred to as a self-scanning component) to a software development environment of the software application. The instructions program the processing unit to configure the software component to: (i) determine occurrence of a condition corresponding to deployment of the software application; and (ii) transmit a set of code files associated with the software application to a vulnerability scanner. In various embodiments, the instructions can program the processing unit to perform one or more of the method steps described above.

In another aspect, an article of manufacture that includes a non-transitory storage medium has stored therein instructions which, when executed by a processor program the processor, which is in electronic communication with a memory, to: configure a software component that is integratable with a software application during compilation or execution thereof, and to provide the software component (also referred to as a self-scanning component) to a software development environment of the software application. The instructions program the processing unit to configure the software component to: (i) determine occurrence of a condition corresponding to deployment of the software application; and (ii) transmit a set of code files associated with the software application to a vulnerability scanner. In various embodiments, the stored instructions can program the processor to perform one or more of the method steps described above.

BRIEF DESCRIPTION OF THE DRAWINGS

Various embodiments of the present invention taught herein are illustrated by way of example, and not by way of limitation, in the figures of the accompanying drawings, in which.

DETAILED DESCRIPTION

Figure 1:
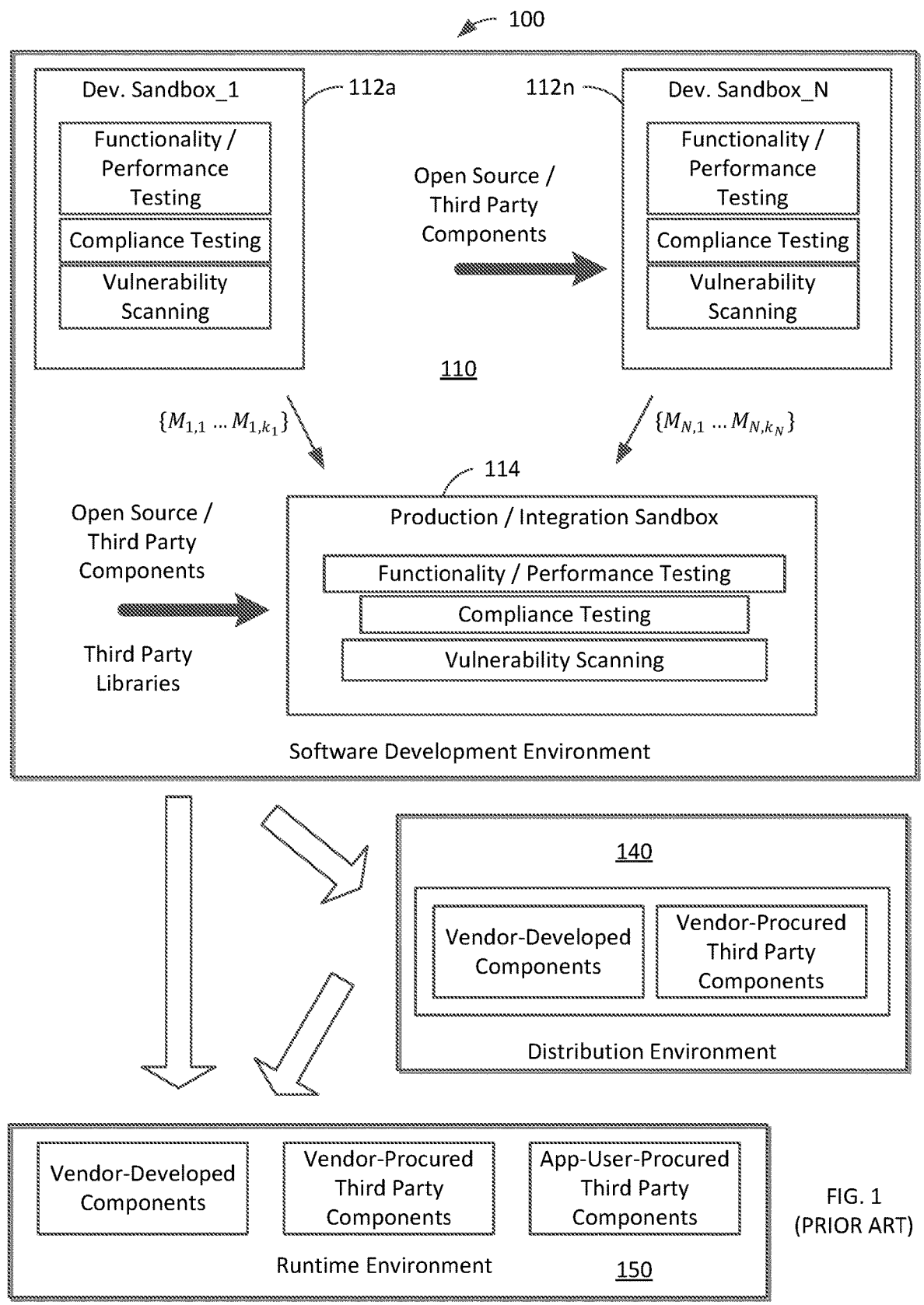
FIG. 1 schematically depicts a typical ecosystem having software development and distribution environments, and a runtime environment.

With reference to FIG. 1, a typical software ecosystem 100 includes a software development environment 110 and a run-time environment 150. The ecosystem 100 also includes a software distribution environment 140, but some software ecosystems may not include a distribution environment. A software development environment generally includes one or more development sandboxes and at least one production sandbox. In some cases, a single sandbox may serve as both the development and the production sandbox. The development environment 110 includes N development sandboxes 112a-112n. In each development sandbox a developer or a team of developers may develop one or more modules/components of a software app to be developed. For example, modules $\{M_{1,1} \ldots M_{1,k_1}\}$ are developed in the development sandbox 112a. Modules $\{M_{N,1} \ldots M_{N,k_N}\}$ are developed in the development sandbox 112n. During such development, one or more developers may incorporate one or more open source components and/or one or more components provided by a third party. Typically, the developers perform functionality testing of the components they develop. Optionally, one or more developers may perform compliance testing, and/or may perform vulnerability scanning of the components using applicable scanner(s).

In the software development environment 110, the production/integration sandbox 114 receives the various components developed in different sandboxes 112a-112n. The production sandbox 114 may also receive open source components, components developed by one or more third parties, and/or libraries provided by one or more third parties. The components received from a third party can be obtained in the source code form or in a machine readable only form. These components are integrated, e.g., compiled, linked, etc., to produce a software app. The integrated software app is typically tested in the production sandbox 114 to ensure that the app is functioning according to the specification thereof and/or meeting the performance goals. Compliance testing and vulnerability scanning of the app is also performed in the production sandbox 114. If the integrated app does not pass the testing/scanning, one or more portions of the app code may be modified, typically in one or more development sandboxes, and the above described integration and testing/scanning steps may be repeated until the app is ready for release.

When the application is ready for release it may be delivered to an app user for installation in the runtime environment of the app user, e.g., the run-time environment 150. The runtime environment may be provided by one or more computing devices such as servers, desktop and laptop computers, tablets, smart phones, etc. The app user may execute the software for its internal use, or may make the app available to end users as a software as a service (SaaS). In some cases, the app owner/developer itself is the app user making the app available as SaaS. In some cases, in addition to the components developed by the app owner/developer and third party components that are included in the app by the owner/developer, the app user may procure and provide additional component(s) that may interact with other component(s) of the app. As such, these additional third party components may be available in the runtime environment only.

In some cases, alternatively or in addition, the app owner/developer may provide the core app (which generally includes the components developed by the app owner/developer and third party components included in the app by the owner/developer) to a distributor, such as an app store. The app is uploaded to a distribution environment, such as the distribution environment 140, that is provided by the distributor. The app user may obtain the core app from the distribution environment, and install it in a runtime environment, as described above.

Figure 2:
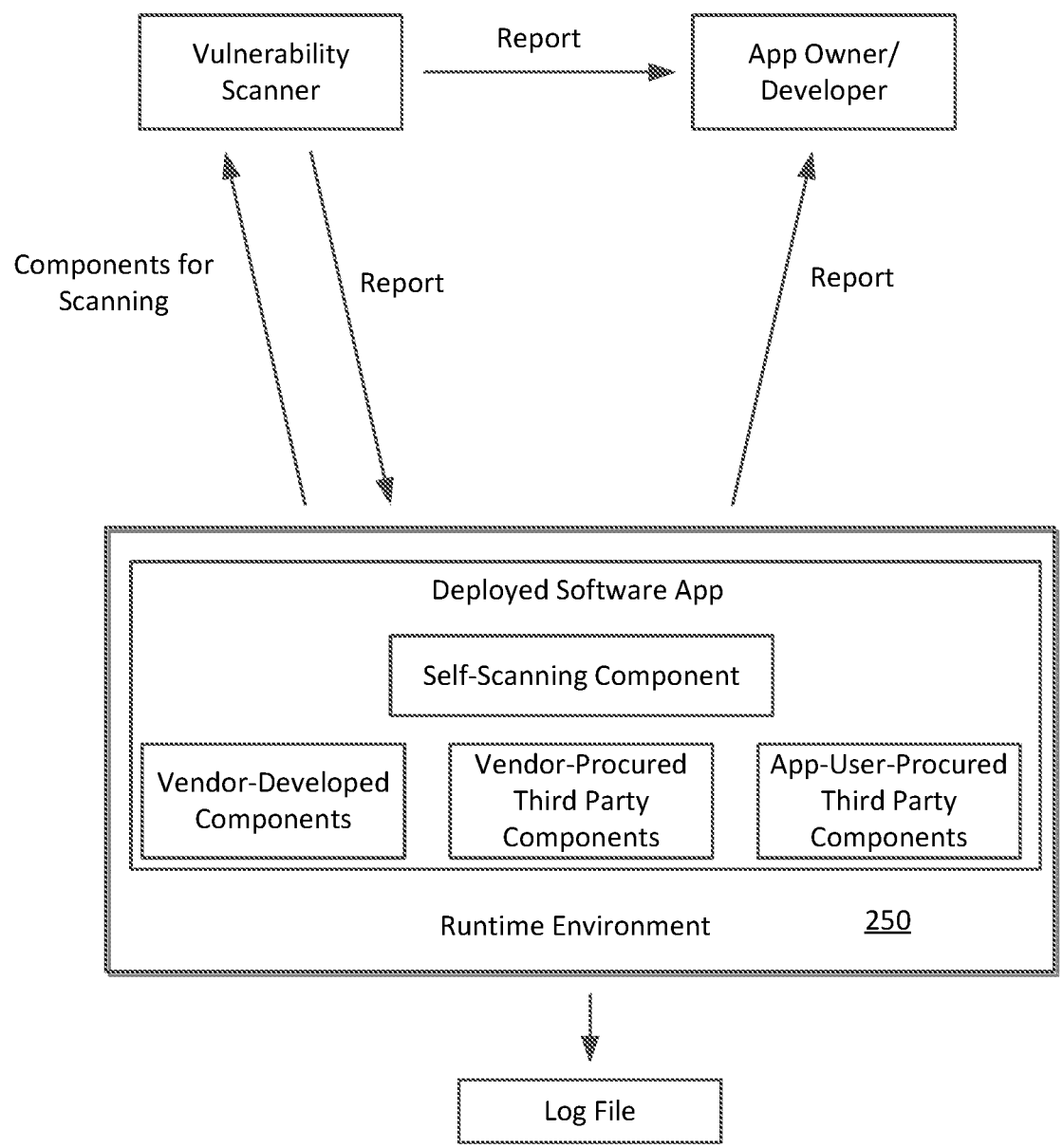
FIG. 2 schematically depicts a software app having a self-scanning component and interactions thereof with a scanning service, according to one embodiment.

With reference to FIG. 2, in various embodiments a self-scanning component is provided to app developers/owners, who can integrate the self-scanning component with the other components that are part of the app during the integration/production phase of app development. After the app is deployed, e.g., in an app user's run-time environment 250 or in a distribution environment, the self-scanning component can collect various components of the app. The collected components are packaged and transmitted to a scanning service for vulnerability scanning. The app can be a web application, a web service, or a client application. The client application can be run on a laptop, tablet, smart phone, etc.

Generally, the installation of one or more app files in a run-time environment (such as the run-time environment 250) is considered a deployment of the app. A first execution of the app in a runtime environment may also be considered a deployment of the app. The run-time environment is generally different from the software development environment. Uploading of the app file(s), for distribution thereof, to a distribution environment that is different from the software development environment may also be considered a deployment of the software app. The runtime environment may be provided on a computing system provided by the app owner/developer's clients. The distribution environment can be a computing system provided by a distributor.

In some embodiments the self-scanning component is configured to collect all components of the app that can be identified and/or determined as interlinked via static and/or dynamic linking. In general, the self-scanning component may identify all of the binary and/or code artifacts that need to be uploaded and may package them in a manner suitable for analysis by a scanning engine to be used for scanning the app. The specific process may be determined by the programming language used for writing the app. For example, in some cases the component collection starts at the root folder of the installation or deployment directory of the app and includes packaging up all of the files with a certain file extension, e.g., .dll in the case of a .NET application; .jar or .war files for a JAVA application; .apk or .ipa files for mobile apps, etc. A regular expression based selection can be performed to select the files/components to be included in the package from all files in the root directory and/or its one or more subdirectories.

In some embodiments, the self-scanning component is configured to collect only those components that are actually loaded in the runtime environment. To that end, the self-scanning component may access the operating system (OS) of the run-time environment to determine which files are loaded and/or are executed, and include at least those files or only those files in the package to be transmitted to the scanner. In some cases, a subset of all of the components to be packaged may be specified in a configuration file or in a setting of the scanning engine that is provided to the self-scanning component. The components can be specified by names, or by type, such as app-owner developed, open source, from a particular vendor, components that changed since the last scan, frequently used (e.g., in at least 40% of the app invocations, in at least 50% of the app invocations, in at least 80% of the app invocations, etc.).

In some cases, the self-scanning component can determine that one or more other components of the app were modified, and may include at least or only the modified components in the package to be transmitted for scanning. In some embodiments, the self-scanning component is configured to include the components developed by the app owner/developer, third party components included in the app by the owner/developer, and components procured and supplied to the runtime environment by the app user. Alternatively, in some embodiments the self-scanning component is configured to exclude components that are not developed by and/or not provided by the app owner/developer, e.g., the third-party components integrated with the app, and/or the components supplied to the runtime environment by the app user. The self-scanning component may, however, create a record of the component(s) that are not included in the package to be transmitted. Such a record may include the name and version number of the component and, optionally, the name of the provider of that component.

In some cases, a selected configuration is pre-configured into the self-scanning component. In other cases, a default configuration is pre-configured, but the self-scanning component is reconfigurable; it is programmed to read a configuration file, which the app user or another entity, such as the app owner/developer, scanning service provider, etc., can provide.

The collection of the components of the app may include packaging the actual components, e.g., the source code, object code, and/or byte code corresponding to the components, and executables, libraries, and/or scripts associated with the app. One or more of these components may be included in the package in an encrypted form. In some cases, the collection includes generating a record of the identities of one or more components, but the actual components are not included in the package. The components can be identified by one or more of the component name, version number, vendor's name, etc. The self-scanning component can be configured to assemble a package by including therein a combination of one or more actual components and the identities of one or more components.

After collecting the components of the app, the app is programmed, via the self-scanning component, to transmit a package of the collected components to a vulnerability scanning server. Such a scanner can analyze the application code in the source and/or binary forms and detect vulnerabilities therein. The analysis can be static analysis, dynamic analysis where an executable of the app is run by the scanning service, or a combination of static and dynamic analysis. The detected vulnerabilities may be represented using a format such as common weakness enumeration (CWE), SysAdmin, Audit, Network, Security (SANS) Institute software security and classification, Institute of Electrical and Electronics Engineers (IEEE) standard classification of software defects, Open Web Application Security Project (OWASP) classification of defects, or using a custom/proprietary format.

In general, the self-scanning component is configured to collect and/or transmit the components associated with the app when one or more deployment conditions become true. As such, in some embodiments, the components are collected/transmitted upon determination that the app is initially deployed and/or executed for the first time, or a new version of the app has been installed in a runtime environment or uploaded to a distribution environment, and/or the new version is executed for the first time. The self-scanning component may be configured to collect/transmit the app components periodically after the initial deployment, e.g., annually, after every six months, quarterly, monthly, bi-weekly, weekly, daily, etc. In some embodiments, the collection/transmission can be configured to occur after a specified period has elapsed since the last vulnerability scan, e.g., after a week, two weeks, month, or another specified period.

In some cases, the self-scanning component is configured to receive a request from a scanning service and/or the app owner/developer and, in response, to collect and/or transmit the components of the app. If a scanner is upgraded/improved and/or if a new vulnerability or a new kind of vulnerability becomes known, the scanner itself may notify various self-scanning components integrated with different deployed software apps and, in response, those self-scanning components may collect and upload the components of the respective software apps for scanning. Alternatively or in addition, the self-scanning component may be configured to poll one or more scanning services and to collect and/or transmit the app components to one or more scanning services based on response(s) from the scanning service. The response may indicate to the self-scanning component that the scanning service has an updated scanner and/or the scanning service has become aware of a new vulnerability or a new kind of vulnerability. Polling a scanning service may include polling a database of newly discovered vulnerabilities. In some cases, the self-scanning component may initiate component collection/transmission when a certain number (e.g., 1, 5, 10, 12, 20, etc.) of new vulnerabilities are recorded in the database of newly discovered vulnerabilities.

In some embodiments, the self-scanning component is configured to receive a request from the app user and to initiate the component collection/transmission in response to the app user's request. The app user may make the request by setting a particular value in a configuration file the app/self-scanning component is programmed to read and analyze. The self-scanning component may also prompt the app user to request the scanning, e.g., by providing options to choose or decline scanning when the app is invoked in the runtime environment.

In some embodiments, the self-scanning component is configured to determine whether the app and/or any of the other components of the app has changed. For example, a patch may have been applied to an installed version of the app, and/or an app component may have been replaced with a different component or a different version thereof, etc. The change may be detected in an app developer provided component and/or in an app user supplied component. Upon detecting that a specified threshold number of components, e.g., 1, 5, 8, 15, 20, or more components, have changed, the self-scanning component may initiate the collection and/or transmission of the app components. The threshold number(s) may be specified collectively for all categories of components, or the thresholds can be category specific, such as one threshold number for components developed by the app owner/developer, the same or a different threshold number for the components integrated by the app owner/developer, and the same or a different threshold number for the components/libraries supplied by the app user. The self-scanning component may also be configured to read a list of specified components and to initiate the component collection/transmission if one or more components in that list are determined to have changed.

Any of the conditions described herein and/or the parameter(s) associated therewith, such as the scanning period, number of components threshold(s), etc., may be pre-configured into the self-scanning component. In some embodiments, a default configuration is pre-configured, but the self-scanning component is reconfigurable; it is programmed to read a configuration file, which the app user or another entity, such as the app owner/developer, scanning service provider, etc., can provide. The app user and/or the other entity may use the configuration file to change, add, and/or remove one or more conditions and/or the parameter(s) associated therewith.

In various embodiments, the self-scanning component is also programmed to receive a report from the vulnerability scanning service and to analyze the report. In some cases, the self-scanning component may determine whether the vulnerability scan successfully completed or failed, and may record this information in the log produced by the app that was scanned. In the case of a failure, the self-scanning component may also record the reported reasons for the failure. The received report may indicate or the self-scanning component may determine by analyzing the report whether the software application: (a) has any vulnerabilities, (b) has no detected vulnerabilities, at least of certain specified type(s), (c) is not compliant with a specified vulnerability profile, or (d) is compliant with the specified vulnerability profile. The self-scanning component may record this received or inferred information in the log of the app.

In some embodiments, the self-scanning component may record all of the detected vulnerabilities that are identified in the report received from the scanning service in the log file of the app. Alternatively, in some embodiments the self-scanning component may record only a certain number (e.g., 2, 5, 10, etc.) of the most severe and/or specified types of detected vulnerabilities. In some embodiments, the self-scanning component may record the detected presence of certain specified types of vulnerabilities and may ignore other types of detected vulnerabilities. The self-scanning component may also be configured to display, e.g., in a pop-up window, an analysis of the report while the app is running. Additionally or in the alternative, in some embodiments the self-scanning component is configured to transmit the report as received, or as analyzed, to the app owner/developer.

Any of the vulnerability reporting/recording schemes described herein and/or the parameter(s) associated therewith, such as the types of vulnerabilities to be reported, number(s) of vulnerabilities overall or of specified types to be reported/recorded, etc., may be pre-configured into the self-scanning component. In some embodiments, a default configuration is provided which can be modified via a configuration file, which the app user or another entity, such as the app owner/developer, scanning service provider, etc., can provide.

Various embodiments described herein, that facilitate vulnerability scanning of apps after deployment thereof may allow app users to receive the benefits of the vulnerability scanning without needing to obtain the software products/tools necessary for such scanning, and/or without manually performing and/or scheduling such scanning. For example, even if an app user cannot modify the app to address a reported vulnerability, the app user can take other measures, such as providing or reconfiguring an app firewall and/or disabling, at least temporarily, a vulnerable functionality, to protect the app and the associated data. Vulnerability scanning of the deployed software may also allow the detection of a previously undetected vulnerability after it becomes known and/or when the scanning technology is improved. Additionally or in the alternative, app owners/developers may be able to improve robustness of the app after receiving latest vulnerability reports. This can result in an improvement of the overall ecosystem of software development, distribution, and execution, and can provide robust apps that can resist various vulnerability attacks, and can facilitate improved protection of app user data.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communications with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, I claim:

1. A method for self-scanning of a software application having a plurality of components including a self-scanning component integrated into the software application, the method comprising:
 determining, by the self-scanning component, that at least a first deployment condition for the software application is satisfied, wherein determining that the first deployment condition is satisfied comprises the self-scanning component determining that the software application has been initially deployed, determining that the software application is being first executed in a runtime environment, determining that a new version of the software application has been uploaded to a distribution environment, or determining that a new version of the software application is being first executed in a runtime environment;
 based on determining that the first deployment condition is satisfied, performing an initial scan of the deployed software application, wherein performing the initial scan includes,
  collecting at least a first subset of the plurality of components, with exception of the self-scanning component; and
  packaging the first subset of components to generate a package and transmitting the package to a vulnerability scanner external to the deployed software application; and
 performing one or more subsequent scans of the deployed software application according to a configuration of the self-scanning component, wherein performing the one or more subsequent scans of the deployed software application according to the configuration comprises performing the one or more subsequent scans based on at least one of,
  determining expiration of a time period since a previous scan by the self-scanning component, and
  detecting when the deployed software application is modified and determining that a configured threshold number of components have been modified.

2. The method of claim 1, wherein the software application is selected from a group consisting of a web application, a web service, and a client application.

3. The method of claim 1, wherein performing the one or more subsequent scans is also based on receipt by the self-scanning component of a notification indicating at least one of an upgrade to the vulnerability scanner and identification of a new vulnerability.

4. The method of claim 3, further comprising:
 polling the vulnerability scanner by the self-scanning component, wherein the notification is received in response to the polling.

5. The method of claim 1, further comprising presenting by the self-scanning component a vulnerability analysis report, wherein presenting the vulnerability analysis report comprises:
 generating at least one of a first log event indicating whether a vulnerability scan was completed successfully, and a second log event indicating at least one of whether the software application: has a vulnerability, has no detected vulnerabilities, is not compliant with a specified vulnerability profile, and is compliant with the specified vulnerability profile; and
 writing at least one of the first and second log events into an application log file.

6. A method comprising:
 based on a self-scanning component integrated into a software application, which comprises a plurality of application components, determining that the software application has been deployed into a runtime environment or distribution platform,
 the self-scanning component identifying a first subset of the plurality of application components; and
 the self-scanning component packaging the identified components and transmitting the package to an external vulnerability scanner; and
 according to a configuration of the self-scanning component, subsequently scanning the software application, wherein subsequently scanning the software application according to the configuration comprises at least one of,
  subsequently scanning the software application based on determining a change to the external vulnerability scanner or another vulnerability scanner; and
  polling a scanning service and determining that a scanning criterion related to the scanning service is satisfied.

7. The method of claim 6, wherein the software application is selected from a group consisting of a web application, a web service, and a client application.

8. The method of claim 6, wherein determining that the software application has been deployed comprises determining at least one of:
 installation of a code file associated with the software application, in a runtime environment on a client device;
 execution of the code file in the runtime environment on the client device; and
 uploading the code file, for distribution thereof, to a distribution environment on another device,
 the runtime and distribution environments being outside of a software development environment.

9. The method of claim 6, further comprising:
 generating, by the self-scanning component, at least one of a first log event indicating whether a vulnerability scan was completed successfully and a second log event indicating at least one of whether the software application (a) has a vulnerability, (b) has no detected vulnerabilities, (c) is not compliant with a specified vulnerability profile, and (d) is compliant with the specified vulnerability profile; and
 writing at least one of the first and second log events into an application log file.

10. A system for self-scanning of a deployed software application having a plurality of components including a self-scanning component integrated into the software application, the system comprising:
 a processor; and
 a memory having the software application stored thereon, the software application comprising a plurality of components that includes the self-scanning component that is executable by the processor to cause the system to:
 determine that at least a first deployment condition of the software application is satisfied, wherein the self-scanning component to determine that the first deployment condition is satisfied comprises the self-scanning component executable by the processor to cause the system to determine that the software application has been initially deployed, determine that the software application is being first executed in a runtime environment of the system, determine that a new version of the software application has been uploaded to a distribution environment that includes the system, or determine that a new version of the software application is being first executed in a runtime environment of the system;

perform an initial scan of the deployed software application, wherein the self-scanning component to perform the initial scan comprises the self-scanning component executable by the processor to cause the system to,
collect at least a first subset of the plurality of components of the system, with exception of the self-scanning component; and
package the first subset of components to generate a package and transmit the package to a vulnerability scanner external to the deployed software application; and
perform one or more subsequent scans of the deployed software application according to a configuration of the self-scanning component, wherein the self-scanning component to perform the one or more subsequent scans of the deployed software application according to the configuration comprises the self-scanning component to,
determine expiration of a time period since a previous scan by the self-scanning component, and
detect when the deployed software application is modified and determining that a configured threshold number of components have been modified.

11. The system of claim 10, wherein the software application is selected from a group consisting of a web application, a web service, and a client application.

12. The system of claim 10, wherein the memory further comprises the self-scanning component executable by the processor to cause the system to:
poll the vulnerability scanner, wherein a notification is received in response to the polling.

13. The system of claim 10, wherein the memory further comprises the self-scanning component executable by the processor to cause the system to:
generate at least one of a first log event indicating whether a vulnerability scan was completed successfully, and a second log event indicating at least one of whether the software application has a vulnerability, has no detected vulnerabilities, is not compliant with a specified vulnerability profile, and is compliant with the specified vulnerability profile; and
write at least one of the first and second log events into an application log file.

14. A system comprising:
a processor; and
a memory having a software application, which comprises a plurality of application components, stored thereon, the software application comprising a plurality of software components that includes a self-scanning component executable by the processor to cause the system to:
determine that the software application has been deployed into a runtime environment of the system or distribution platform that includes the system,
identify a first subset of the plurality of application components of the software application;
package the identified components to generate a package and transmit the package to an external vulnerability scanner; and
according to a configuration of the self-scanning component, subsequently scan the software application, wherein the self-scanning component to subsequently scan the software application according to the configuration comprises the self-scanning component executable by the processor to cause the system to at least one of,
subsequently scan the software application based on a determination of a change to the external vulnerability scanner or another vulnerability scanner; and
poll a scanning service and determine that a scanning criterion related to the scanning service is satisfied.

15. The system of claim 14, wherein the software application is selected from a group consisting of a web application, a web service, and a client application.

16. The system of claim 14, wherein the self-scanning component executable to determine that the software application has been deployed comprises the self-scanning component executable by the processor to cause the system to perform at least one of:
installation of a code file associated with the software application, in a runtime environment on a client device;
execution of the code file in the runtime environment on the client device; and
uploading the code file, for distribution thereof, to a distribution environment on another device,
the runtime and distribution environments being outside of a software development environment.

17. The system of claim 14, wherein the memory further comprises the self-scanning component executable by the processor to cause the system to:
generate at least one of a first log event indicating whether a vulnerability scan was completed successfully, and a second log event indicating at least one of whether the software application has a vulnerability, has no detected vulnerabilities, is not compliant with a specified vulnerability profile, and is compliant with the specified vulnerability profile; and
write at least one of the first and second log events into an application log file.

18. The method of claim 1, wherein determining that the first deployment condition is satisfied comprises determining that a threshold number of application components have been modified.

19. The system of claim 10, wherein the self-scanning component to determine whether a first deployment condition of the software application is satisfied comprises the self-scanning component executable by the processor to cause the system to determine whether a threshold number of application components have been modified.

20. The method of claim 1, wherein collecting at least a first subset of the plurality of components, with an exception of the self-scanning component comprises at least one of:
determining an interlinked subset of the plurality of components by analyzing the plurality of components for static linking or dynamic linking;
collecting a subset of the plurality of components having a file extension, wherein collecting the subset of the plurality of components having the file extension comprises searching, starting in a root directory and continuing in sub directories, for application components having the file extension; and
collecting a subset of the plurality of components loaded in the runtime environment based, at least in part, on accessing an operating system of the runtime environment.

21. The method of claim 1, wherein packaging the first subset of components and transmitting the package to a vulnerability scanner external to the deployed software application comprises at least one of:
packaging source code, object code, or byte code corresponding to the first subset of the plurality of components; and generating a record of identities for the first subset of the plurality of components, wherein the record of identities for the first subset of the plurality of components comprises at least one of a component name, a version number, and a vendor name for application components in the first subset of the plurality of components.

22. The method of claim 1, wherein performing one or more subsequent scans of the deployed software application according to a configuration of the self-scanning component comprises:
receiving, from a scanning service, a request to collect application components for the software application based on at least one of the vulnerability scanner being upgraded or improved and a new known vulnerability for the software application;
collecting a second subset of the plurality of components based on the request to collect application components for the software application; and
packaging the second subset of components and transmitting the package to the scanning service.

23. The method of claim 1, wherein performing one or more subsequent scans of the deployed software application according to a configuration of the self-scanning component comprises:
polling a scanning service for a plurality of new known vulnerabilities for the software application; and
collecting a second subset of the plurality of components based on a scanning criterion for the plurality of new known vulnerabilities; and
packaging the second subset of components and transmitting the package to the scanning service.

24. The system of claim 10, wherein the self-scanning component to collect at least a first subset of the plurality of components, with exception of the self-scanning component comprises the self-scanning component executable by the processor to cause the system to at least one of:
determine an interlinked subset of the plurality of components by analyzing the plurality of components for static linking or dynamic linking;
collect a subset of the plurality of components having a file extension, wherein collecting the subset of the plurality of components having the file extension comprises searching, starting in a root directory and continuing in sub directories, for application components having the file extension; and
collect a subset of the plurality of components loaded in the runtime environment based, at least in part, on accessing an operating system of the runtime environment.

25. The system of claim 10, wherein the self-scanning component to package the first subset of components and transmitting the package to a vulnerability scanner external to the deployed software application comprises the self-scanning component executable by the processor to cause the system to at least one of:
package source code, object code, or byte code corresponding to the first subset of the plurality of components; and
generate a record of identities for the first subset of the plurality of components, wherein the record of identities for the first subset of the plurality of components comprises at least one of a component name, a version number, and a vendor name for application components in the first subset of the plurality of components.

26. The system of claim 10, wherein the self-scanning component to perform one or more subsequent scans of the deployed software application according to a configuration of the self-scanning component comprises the self-scanning component executable by the processor to cause the system to:
receive, from a scanning service, a request to collect application components for the software application based on at least one of the vulnerability scanner being upgraded and a new known vulnerability for the software application;
collect a second subset of the plurality of components based on the request to collect application components for the software application; and
package the second subset of components and transmit the package to the scanning service.

27. The system of claim 10, wherein the self-scanning component to perform one or more subsequent scans of the deployed software application according to a configuration of the self-scanning component comprises the self-scanning component executable by the processor to cause the system to:
poll a scanning service for a plurality of new known vulnerabilities for the software application; and
collect a second subset of the plurality of components based on a scanning criterion for the plurality of new known vulnerabilities; and
package the second subset of components to generate a second package and transmit the second package to the scanning service.

28. The method of claim 6, further comprising identifying, by the self-scanning component, vendor developed components or open source components of the software application.

29. The method of claim 6, further comprising providing the software application to a user runtime environment for installation.

30. The method of claim 6, wherein the first subset of application components comprise at least one of application components developed by a third party and libraries provided by the third party, further wherein the plurality of application components are integrated into the software application.

31. The method of claim 6, wherein determining a change to the external vulnerability scanner or another vulnerability scanner comprises receiving a notification that the external vulnerability scanner or another vulnerability scanner is upgraded.

32. The method of claim 6, wherein determining a change to the external vulnerability scanner or another vulnerability scanner comprises receiving a notification of a new known vulnerability for the software application.

33. The system of claim 14, wherein the memory further comprises the self-scanning component executable by the processor to cause the system to identify, by the self-scanning component, vendor developed components or open source components of the software application.

34. The system of claim 14, wherein the memory further comprises the self-scanning component executable by the processor to cause the system to provide the software application to a user runtime environment for installation.

35. The system of claim 14, wherein the first subset of application components comprises at least one of application components developed by a third party and libraries provided by the third party, further wherein where the plurality of application components are integrated into the software application.

36. The system of claim 14, wherein the self-scanning component to determine a change to the external vulnerability scanner or another vulnerability scanner comprises the self-scanning component executable by the processor to cause the system to receive a notification that the external vulnerability scanner or another vulnerability scanner is upgraded.

37. The system of claim 14, wherein the self-scanning component to determine a change to the external vulnerability scanner or another vulnerability scanner comprises the self-scanning component executable by the processor to cause the system to receive a notification of a new known vulnerability for the software application.

* * * * *